Feb. 3, 1942. O. SINGER 2,272,135
SELF-LAYING TRACK FOR VEHICLES
Filed Dec. 5, 1940 3 Sheets-Sheet 1

INVENTOR
OTTO SINGER

Feb. 3, 1942. O. SINGER 2,272,135
SELF-LAYING TRACK FOR VEHICLES
Filed Dec. 5, 1940 3 Sheets-Sheet 2
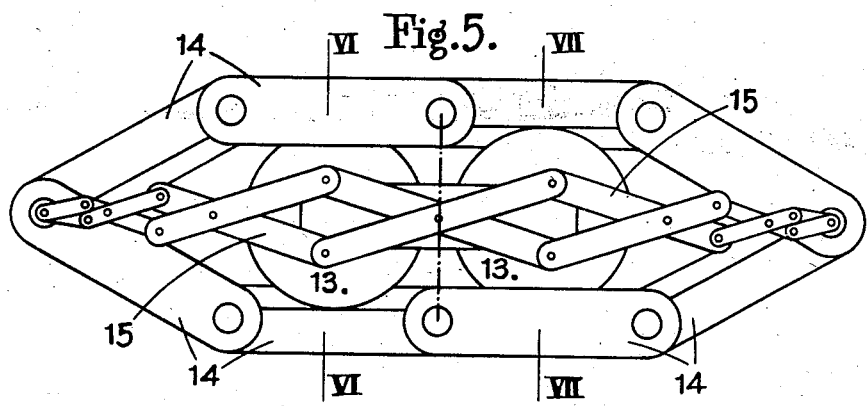
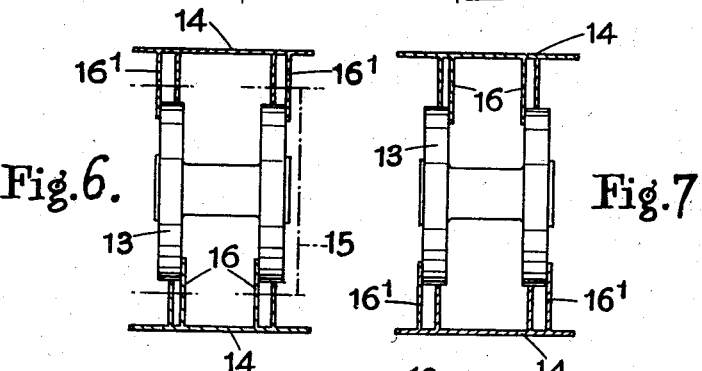
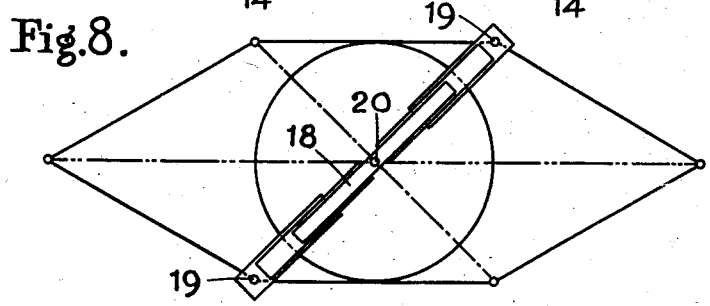
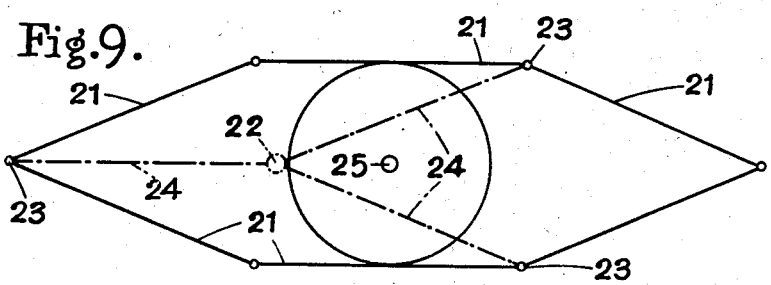
INVENTOR
OTTO SINGER Feb. 3, 1942.   O. SINGER   2,272,135
SELF-LAYING TRACK FOR VEHICLES
Filed Dec. 5, 1940   3 Sheets-Sheet 3

INVENTOR
OTTO SINGER
By Wachenster & Groff Attys

Patented Feb. 3, 1942

2,272,135

UNITED STATES PATENT OFFICE 2,272,135

SELF-LAYING TRACK FOR VEHICLES

Otto Singer, Winchmore Hill, London, England

Application December 5, 1940, Serial No. 368,705
In Great Britain November 25, 1939

8 Claims. (Cl. 305—13)

This invention relates to a self-laying track for vehicles of all kinds of the type which is provided with track elements automatically laid as a track for the vehicle when same is propelled, for the purpose of facilitating the movement of the vehicle over soft, rough or other ground unsuitable for ordinary wheels.

The object of the invention is to provide an efficient arrangement of self-laying track, wherein the various track elements will operate smoothly and without meeting the ground with force and the consequent shock and waste of energy. Self-laying tracks of the above type usually travel noisily with poor efficiency.

According to the invention a track laying wheel for vehicles comprises a wheel proper surrounded by a track consisting of inter-pivoted track elements of the same length and even in number (at least six), and mechanical connecting means between said track elements which constrain diametrically opposite track elements to maintain positions parallel to one another (disregarding friction in the pivots thereof) during the motion of the wheel.

By this arrangement the track elements do not hit the ground as they are successively laid, but are applied to it gently with a speed which, at least theoretically, is equal to zero, no (or very little) energy is wasted, noise is greatly reduced and efficiency is increased. A further benefit is that wear and tear of the parts is also considerably reduced.

While it has already been proposed to provide self-laying tracks consisting of inter-pivoted sections, in no prior construction is there a connection provided between the track elements, whereby the parallel position thereof with respect to one another is maintained during the motion of the vehicle with consequently diminishing angular speed of the track element being laid.

As aforesaid, track elements of equal length and even number are employed, and it has also been stated that there must be at least six such elements to enable the object of the invention to be achieved. The number of track elements may be greater than six and in certain cases eight is a very suitable number. The mechanical connecting means may be variously constructed and in a convenient embodiment of the invention consist of at least one pair of lazy tongs, but other examples of connecting means will also be referred to hereinafter.

Various embodiments of the invention will now be described by way of example with reference to the accompanying drawings, wherein:

Figure 5 is a side elevation of a modification;

Figure 6 is a section on the line VI—VI of Figure 5;

Figure 7 is a section on the line VII—VII of Figure 5;

Figures 8 and 9 show modified connecting elements;

Figure 1:
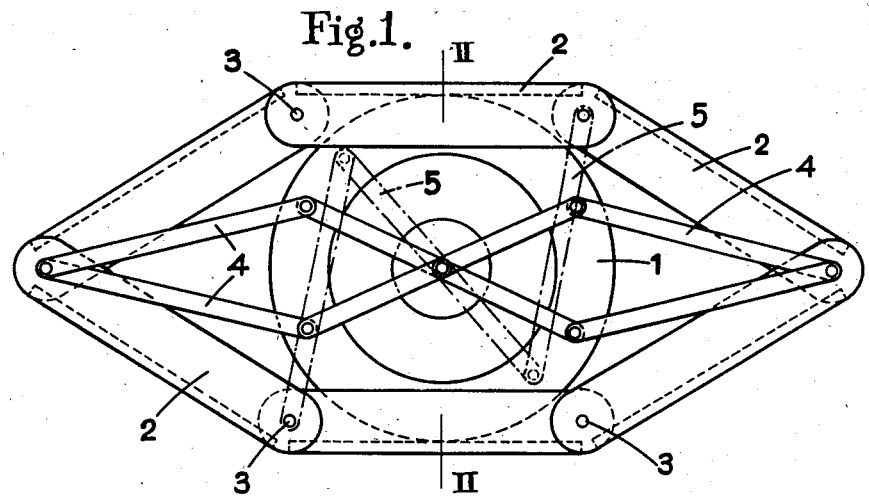
Figure 1 is a diagrammatic side elevation of a self-laying track according to the invention fitted around the wheel of a vehicle.

Referring to Figure 1, 1 indicates the wheel of a vehicle which is surrounded by a track consisting of six elements 2 of equal length and pivoted together at their ends by pivots 3. It will be noted that for a single wheel, the number of track elements employed is two to engage the one wheel at a given instant, and four others to act as connections at that instant. Diametrally opposed track elements 2 are maintained in parallel disposition by connecting means consisting of a collapsible linkage element adapted to maintain colinearity of at least three of its points. In this example, this element consists of a pair of lazy tongs (or lattice linkage) 4 connecting together one pair of diametrally opposite pivots 3, operative connection between the track and the wheel 1 being established by the fact that the lazy tongs 4 are rockably mounted as a whole about the axle of the wheel. Owing to the fact that the middle one of the three lower track elements cannot vary its distance from the center of the wheel because the wheel rests on it, the angular disposition of the three lower elements will be invariable for any given position of the wheel along the element on which it happens to be running, but the middle one of the upper three elements not being so fixed, it is possible for the upper three elements to assume various angular dispositions with reference to a given position of the wheel 1 as defined above. Theoretically, if the friction in the joints 3 is disregarded, the upper three elements 2 will always assume parallel positions to their diametrally opposite counterparts under the action of gravity. Practice, unless the friction in the joints 3 is exceptionally great, will follow the theory, but where it is expected that friction might develop which will prevent opposite track elements from assuming parallel positions under gravity action, another two diametrally opposed pivots 3 may be connected together for example by means of half a pair of lazy tongs indicated at 5 in chain dotted lines. It should be noted that each of the three pairs of diametrally opposite pivots may be interconnected by a pair of lazy tongs, or a further half a pair of lazy tongs may be added to connect together the third pair of diametrally opposed pivots in Figure 1.

Figure 2:
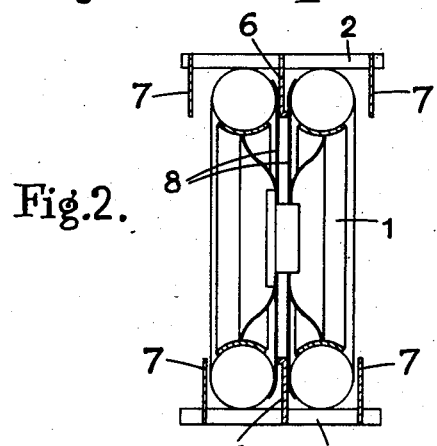
Figure 2 is a section on the line II—II of Figure 1, showing some details of construction, and with some parts omitted for clearness.

Figure 2 illustrates diagrammatically a useful constructional embodiment of the invention as applied to a wheel with double rubber tires. Alternate track elements 2 are provided with a center rib 6 and side ribs 7 respectively, the former of which engage between the two tires, while the latter engage on the outer sides of the tires. This arrangement prevents any dislocation of the track from the general plane of the wheel. To prevent any possible damage to the tires by the rubbing thereagainst of the center ribs 6, protective discs 8 of metal are mounted on the inner sides of the tires and similar discs may be mounted on the outer sides of the tires to safeguard against damage thereto from the outer ribs 7.

Figure 3:
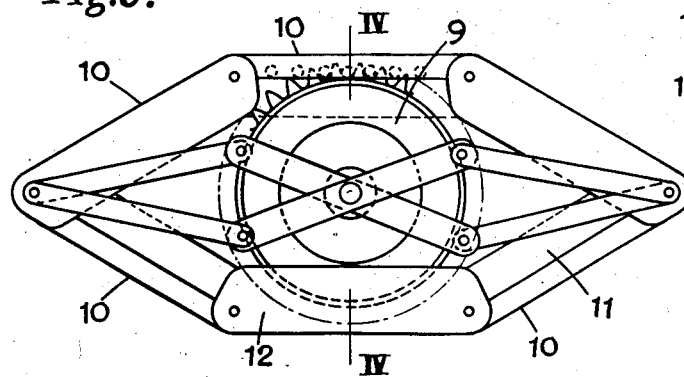
Figure 3 is a view similar to Figure 1, showing certain constructional modifications.
Figure 4:
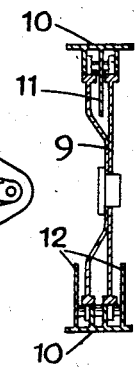
Figure 4 is a section on the line IV—IV of Figure 3.

Figures 3 and 4 show a constructional modification, wherein the wheel 9 of a vehicle is constructed as a gear wheel and the track elements 10 are constructed as corresponding racks in the teeth of which the teeth of the vehicle wheel engage. Conveniently, the wheel is made with two parallel annuli of teeth as will be seen in Figure 4 and alternate track elements 10 are again formed with a center rib 11 and outer ribs 12 respectively, the former of which engage between the two annuli of teeth of the wheel 9, while the latter engage the wheel on both sides, thus eliminating any possibility of the track being dislocated from the wheel.

Figures 5 to 7 show the application of the invention to the tandem arrangement of a pair of driving wheels 13 of, for example, a six wheel vehicle. In this instance, the track consists of eight elements 14 of equal lengths, two diametrally opposed pivots being interconnected by a pair of lazy tongs 15 which, it will be noted, has a substantially greater number of links than the lazy tongs 4 shown in Figures 1 and 3. It will be noted that the number of elements employed is two to engage each of the two wheels at a given instant, making four, and four others to act as connections at that instant. The number of links of the lazy tongs is, of course, immaterial and is determined only by the particular requirements of each individual application of the invention. Alternate track elements are again provided with inner and outer ribs generally indicated at 16 and 16' respectively in Figures 6 and 7, these ribs having the same function and purpose as the ribs 6, 7, 11 and 12 described with reference to the foregoing embodiments.

The extensible mechanical connecting means may be variously constructed, although lazy tongs are probably the most convenient in the majority of cases.

Figure 8 shows an alternative construction wherein diametrally opposed pivots of the track elements are interconnected by telescopic tubes or slidable frames 18, the outer members of which are rockable about the pivots 19 of the track elements, the inner ones being rockable about the wheel axle 20.

Figure 9 shows a construction wherein the parallel disposition of diametrally opposed track elements 21 is maintained by the provision of a floating center hub 22 connected to alternate track element joints 23 by links 24. In this case the wheel axle 25 is connected to the track sections in any suitable manner for imparting movement to the track elements, for example by means of springs, half lazy tongs or telescopic tubes, or the wheel may be a gear wheel and the track elements may be racks.

Figure 10:
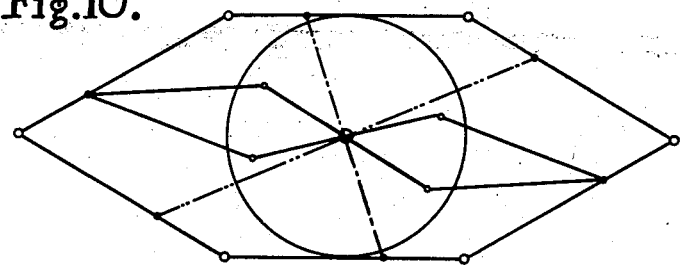
Figure 10 shows a further modification.

Figure 10 is an illustration showing that it is not necessary to interconnect diametrally opposite track elements at their joints as in the foregoing examples, it being possible to connect these elements together at points along their lengths as shown.

Figure 11:
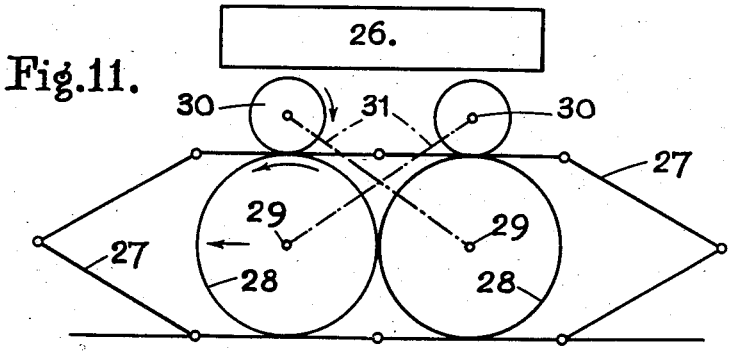
Figure 11 shows a giant track with a vehicle running on the outer periphery thereof.

Figure 11 shows an arrangement wherein a vehicle 26 runs on a giant eight-link tract 27. The expression "giant" is here used to denote that the track is considerably larger than the road wheels of the vehicle, in contrast to the previous examples, where the track is just large enough to surround single or tandem wheels of the vehicle. The track 27 has disposed within same two wheels 28 the axles 29 of which are connected rigidly to the axles 30 of the vehicle 26 by means of struts 31. Drive applied to the road wheels of the vehicle will thus be communicated to the wheels 28 and it will be noted that for forward movement the wheels of the vehicle will have to run in reverse and for reverse movement in forward gear. The elements of the track 27 are interconnected in the manner described with reference to the previous embodiments.

Figure 12:
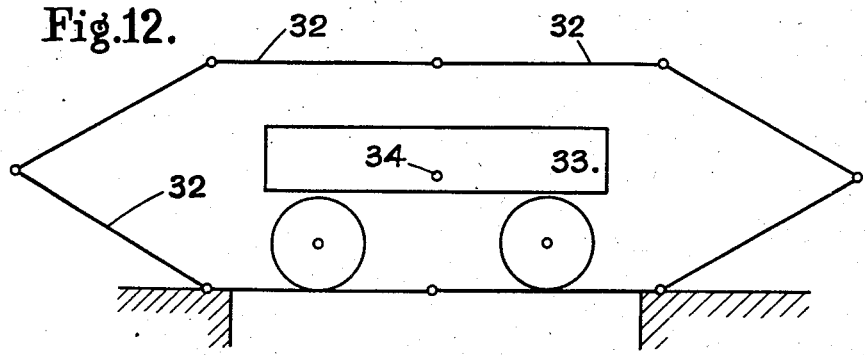
Figure 12 shows a giant track with a vehicle running on the inside periphery thereof.

Referring to Figure 12, a giant track 32 is again employed, the whole vehicle 33 running inside it. Diametrally opposite track elements are interconnected as before, a point 34 on the chassis of the vehicle serving as centre for the mechanical connecting means.

The giant tracks illustrated in and described with reference to Figures 11 and 12 enable a vehicle to cross ditches, trenches and such like, wider than its length, and in the case of the arrangement shown in Figure 11 a ford or river may be crossed without the vehicle or its contents becoming wet.

It should be noted that the various connecting means for the track elements described above may be used in combination.

Figure 13:
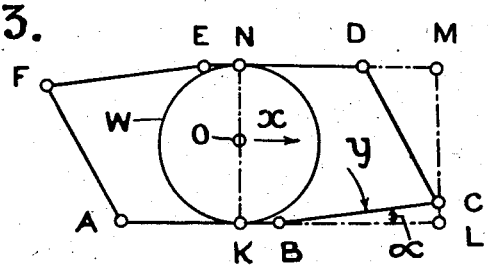
Figure 13 is a diagram illustrative of the fact that the track element laid next in succession to that on the ground is applied to the ground with an angular speed equal to zero.

Finally, the diagram in Figure 13 will assist in proving that, in the invention, the angular speed of a track element being laid next in succession to the one on the ground gradually diminishes and becomes nil on reaching the ground. This feature assures smooth operation and avoids waste of energy.

The wheel W is surrounded by a six-element track AB, BC, CD, DE, EF, FA. In the position shown, the wheel travels on the element AB in direction $x$, and owing to the hereinbefore described mechanical connection between diametrally opposite elements such as AB and DE, these elements are constrained to maintain parallel disposition and also, as a result of such connection, the track element BC is being laid by rocking about the pivot B in the direction of the arrow $y$ as a length of track next in succession to AB. It will be shown that the angular speed $\omega$ of element BC gradually diminishes and becomes nil in reaching the ground.

Produce AB and DE, draw a perpendicular to the lines produced through C to intersect same as L and M respectively. Draw a perpendicular to AB and DE through centre O of wheel W to intersection AB at K and DE at N.

$$AB=BC=CD=DE=EF=FA=KN=2r \quad (1)$$
$$KB=EN=a \quad (2)$$

$a$ being the distance travelled by the wheel W from the position shown during the time required for the track element BC to reach the ground and for angle $\alpha$ to become zero.

$$ND=2r-a \quad (3)$$
$$BL=2r \cos \alpha \quad CL=2r \sin \alpha$$
$$MC=2r-2r \sin \alpha \quad (4)$$
$$DM=KB+BL-ND=2a+2r \cos \alpha -2r \quad (5)$$
$$(DM)^2+(MC)^2=(CD)^2$$

from (1), (4) and (5):

$$(2a+2r \cos \alpha -2r)^2+(2r-2r \sin \alpha)^2=4r^2$$
$$4a^2+4r^2 \cos^2 \alpha +4r^2-8ar-8r^2 \cos \alpha +8ar \cos \alpha +4r^2+4r^2 \sin^2 \alpha -8r^2 \sin \alpha =4r^2$$
$$4a^2+8r^2-8ar-8r^2 \cos \alpha +8ar \cos \alpha -8r^2 \sin \alpha =0$$

differentiate and divide by 8:

$$a\,da-r\,da+r^2 \sin \alpha\,d\alpha+r \cos \alpha\,da-ar \sin \alpha\,d\alpha-r^2 \cos \alpha\,d\alpha=0$$

$$d\alpha=\frac{a-r+r \cos \alpha}{ar \sin \alpha +r^2 \cos \alpha -r^2 \sin \alpha}da$$

divide by $dt$:

$$\omega=\frac{a-r+r \cos \alpha}{ar \sin \alpha +r^2 \cos \alpha -r^2 \sin \alpha}V_0$$

where $V_0$ is the speed of the centre O of the wheel W.

Assuming angle $\alpha$ is very small, then distance $a$ is very small and $\sin \alpha$ is very small, and $\cos \alpha$ is very nearly equal to unity.

$$\omega=\frac{O.V_0}{r^2}=0$$

that is to say $\omega=0$ on BC reaching the ground.

I claim:

1. In a self-laying track for vehicles, an even number of track elements of substantially equal length pivotally connected together by pivots end to end to form a continuous track, a vehicle wheel unit comprising journal means and mounted to travel on said track, and a mechanical collapsible linkage element adapted to maintain colinearity of at least three of its points, said linkage element being pivotally connected at one of said colinear points to said journal means and at two other of its colinear points to diametrically opposed pivots connecting adjacent track elements.

2. A track according to claim 1, said linkage element comprising a lazy tong lattice linkage having its terminal pivots on diametrically opposed pivots connecting adjacent track elements, and being pivoted to said journal means at the intersection of its lattice elements constituting its central section.

3. A track according to claim 1, said linkage element comprising a plurality of rigid mutually telescoping linear members arranged to be colinear in any degree of colinear extension.

4. A track according to claim 1, alternate ones of said track elements respectively comprising a center rib, and lateral spaced ribs mounted to terminally receive the center rib of the adjacent track element.

5. A track according to claim 1, the number of said track elements being so chosen with reference to the number of wheels comprised in said wheel unit that diametrically opposed track elements are maintained substantially parallel to each other.

6. A track according to claim 1, the number of said track elements being four greater than twice the number of wheels comprised in said wheel unit.

7. A track according to claim 1, said wheel unit comprising a single wheel and the number of said track elements being six.

8. A track according to claim 1, said wheel unit comprising two wheels in tandem, and the number of said track elements being eight.

OTTO SINGER.